Feb. 22, 1955 M. CAMRAS 2,702,835

ERASE HEAD FOR MAGNETIC RECORDERS

Filed Aug. 25, 1945

Inventor
Marvin Camras by The Firm of Charles W. Hills Attys 2,702,835

United States Patent Office

Patented Feb. 22, 1955

2,702,835

ERASE HEAD FOR MAGNETIC RECORDER

Marvin Camras, Chicago, Ill., assignor to Armour Research Foundation of Illinois Institute of Technology, Chicago, Ill., a corporation of Illinois Application August 25, 1945, Serial No. 612,688

12 Claims. (Cl. 179—100.2)

This invention relates to magnetic recording devices and more particularly to a head for magnetic recorders or reproducers.

One general class of magnetic recording devices effects magnetization of a traveling record medium which is completely demagnetized just prior to the time when it receives the magnetizing signal. When the traveling record medium is of a medium carbon steel type, complete demagnetization of the record medium is effected without too great difficulty. When the traveling record medium, however, has a relatively high coercive force, such, for example, as magnetic stainless steel wire, great difficulty has been experienced in the past in completely demagnetizing the wire prior to its entry into the recording head of the magnetic recorder. Since magnetic recording mediums having a high coercive force are extremely desirable, and particularly recording mediums of the so-called magnetic stainless steel variety, it is extremely important that satisfactory demagnetization of the medium be obtained. A second highly desirable characteristic of a demagnetizing head is that it shall be of the open slot or open throat type so that the wire may be dropped into the demagnetizing head even though both ends of the wire are being held, such, for example, as being held on two spools.

One of the principal features and objects of the present invention is to provide a novel demagnetizing or erase head having the above highly desirable characteristics.

A further object of the present invention is to provide a novel demagnetizing or erase head for a magnetic recording device which is of the open throat or open slot type.

Another object of the present invention is to provide a demagnetizing or erase head for magnetic recording devices which is particularly effective for demagnetizing traveling record mediums having high coercive force.

Still another object of the present invention is to provide a novel demagnetizing or erase head which is particularly efficient and effective in demagnetizing stainless steel wire.

Still another and further object of the present invention is to provide a novel demagnetizing or erase head which is extremely economical to manufacture and whose core piece may be made from a stamping.

Another and still further object of the present invention is to provide a novel demagnetizing or erase head in which the magnetic poles are not symmetrical.

Still another and further object of the present invention is to provide a novel demagnetizing or erase head having a series of non-magnetic gaps and a plurality of energizing coils therein.

Heads of the above referred type have also been found effective for use as a recording head or as a reproducing head. It is, therefore, an object of the present invention to provide a recording or reproducing head which embodies one or more of the above advantageous features of my erase head.

The novel features which I believe to be characteristic of my invention are set forth with particularity in the appended claims. My invention itself, however, both as to its organization, method of operation and manner of construction, together with further objects and advantages thereof, may best be understood by reference to the accompanying drawing, in which Figure 1 is a front elevational view of an erase head for magnetic recording device embodying the novel principles and teachings of the present invention;

Figure 1:
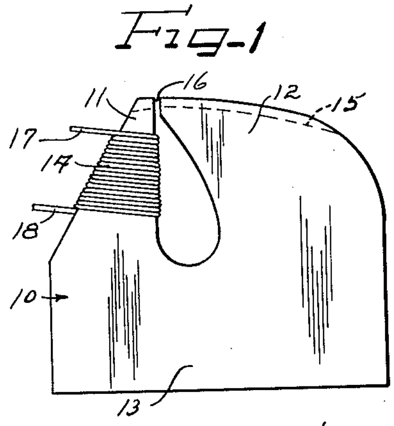
Figure 2:
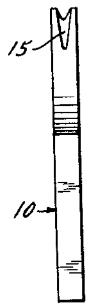
Figure 2 is a right end view with the energizing coil removed.

Referring now to Figures 1 and 2 of the drawing, there is illustrated therein an erase head for a magnetic recording device comprising a core piece 10 which may be conveniently made from a stamping and preferably is formed of a material having a high magnetic saturation value, such, for example, as silicon steel alloy. This stamping 10 includes two pole portions 11 and 12 which are connected together by a base portion 13. It will be observed that the pole portion 12 and the base portion 13 have a relatively large mass or area as compared with the pole portion 11.

An explanation for the above is that you want the highest possible flux density in the non-magnetic gap with minimum power input. This is obtained by making those parts of the core 10 which operate at high flux density as small as possible for it is in regions of high flux density that the principal losses arise. It has been found in practice that when an erase head is shaped in the particular manner shown in Figure 1 (or like the other figures of the drawing), extremely good results are obtained. More particularly, it has been found that when the energizing coil 14 is wound on a pole portion of relatively small area as compared with the relatively large area of the second pole portion, much better results are obtained. It has furthermore been found that a tapered pole portion for the energizing coil provides particularly good results. With a core shaped in this manner the region of high flux density is in the small tapered pole tip 11 and the end of the pole 12.

The core plate 10 is slotted or grooved along its upper edge at 15. The non-magnetic gap 16 between the pole portion 11 and the pole portion 12 may be either an air gap or it may be filled with any non-magnetic material, such, for example, as solder.

The coil 14 may be connected through conductors 17 and 18 to a suitable source of alternating electric energy, such, for example, as an oscillator 14′ having a frequency above the audible range. This coil 14 may be wound in advance and slipped over the polar portion 11 by bending the polar portion 11 laterally away from the polar portion 12, slipping the coil thereon, and then bending it back to position. After the pole portion 11 is bent back into position a drop of solder, if desired, may be placed in the non-magnetic gap 16 to hold the two polar portions 11 and 12 at a fixed distance apart. While this spacing between the polar portions 11 and 12 may vary to a considerable extent without departing from the spirit and scope of the present invention, it has been found, by way of example, that a spacing of .010″ gives very satisfactory results.

The traveling record medium 9 lies in the slot 15 and travels from left to right as viewed in Figure 1 of the drawing.

Figure 3:
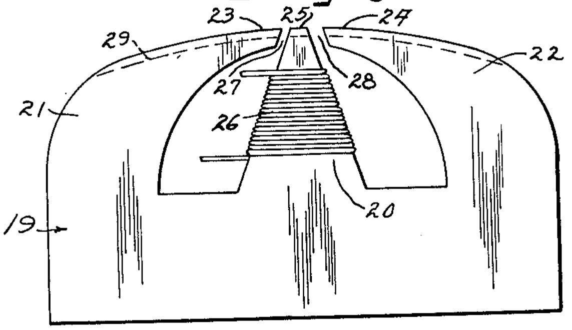
Figure 3 is a front elevational view of a second embodiment of the present invention.

The embodiment of the invention shown in Figure 3 of the drawing is somewhat similar to that shown in Figure 1 but has an additional polar portion. More particularly, the core piece 19 of the form of the invention shown in Figure 3, includes an upstanding tapered central pole portion 20 and two curved end polar portions 21 and 22 which extends upwardly and then centrally toward the upper end of the central pole portion 20. The generally arcuate shaped end portions 21 and 22 gradually decrease in size so that they are relatively small at their tips 23 and 24 which lie directly opposite the tip 25 of the central pole portion 20. A coil 26 is arranged to be slipped over the central pole portion 20 and may be energized from any suitable source of alternating electric energy.

It has been found in practice that extremely good results may be obtained by making the non-magnetic gap 27, lying between the pole tip 23 and the pole tip 25, somewhat smaller than the non-magnetic gap 28 which lies between the pole tip 24 and the pole tip 25. For example, extremely good results have been obtained in practice by making the non-magnetic gap 27 approximately .010" and the non-magnetic gap 28 approximately .020".

It is to be understood that the traveling record medium travels through an open throat or slot formed by a groove 29 in the top edge of the core piece 19. It is further to be understood that the traveling record medium 9 which is usually in the form of wire, passes from left to right as viewed in Figure 3 of the drawing, and thus passes through the gaps 27 and 28 in succession. Hence the record medium is really erased twice. While the gaps may be equal, improved results are obtained by making the second gap larger. Under such construction the shorter gap has a more concentrated magnetic field for removing the principal signals on the record medium and the larger gap has a weaker field but is spread over a relatively longer distance and hence removes all traces of noise.

Figure 4:
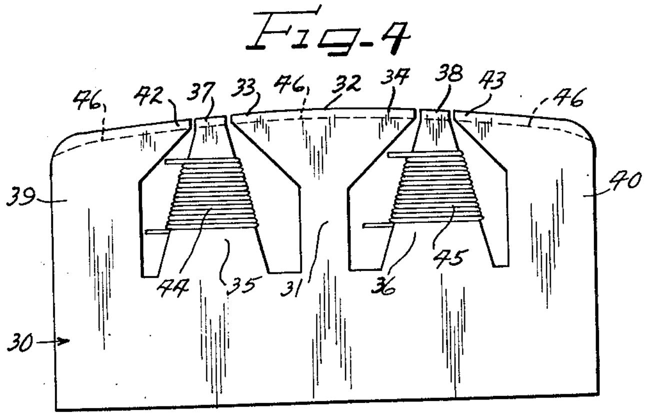
Figure 4 is a front elevational view of a third embodiment of the present invention.

In the embodiment of the invention shown in Figure 4 of the drawing, the core piece 30 includes an upstanding central portion 31 having a large flaring head 32 which terminates in pole tip portions 33 and 34. On either side of the central pole portion 31 are two tapered pole portions 35 and 36 which terminate in pole tips 37 and 38. Two end polar portions 39 and 40 are also provided which extend first upwardly and then inwardly toward the tapered pole portions 35 and 36 respectively and terminate in pole tips 42 and 43 opposite pole tips 37 and 38 respectively. The tapered pole portions 35 and 36 are provided with energizing coils 44 and 45 which may be connected to any suitable source of alternating electric energy. The coils 44 and 45 are so wound that they are polarized in the same direction. That is to say that in an instant of time when the pole tip 37 is a north pole, the pole tip 38 is also a north pole. Thus when the pole tips 37 and 38 are north poles, the pole tips 42, 33, 34 and 43 are all south poles. Likewise, when the pole tips 37 and 38 are south poles the pole tips 42, 33, 34 and 43 are north poles. When relatively high frequency is used to energize the coils 44 and 45 substantially as good results are obtained even though the coils 44 and 45 are polarized in opposite directions.

Upon energization of the coils 44 and 45 with alternating electric energy, a fluctuating or alternating magnetic field is set up in the non-magnetic gap between the various pole tips.

An open slot or groove 46 is provided in the top edge of a core piece 30 to receive a traveling record medium which travels from left to right as viewed in Figure 4.

It has been found that if the gaps in the core 30 of Figure 4 are gradually increased from left to right, the demagnetizing field is gradually decreased. This has been found effective to remove both signals previously placed on the wire as well as noise.

In all three embodiments of the present invention hereinbefore described a very concentrated alternating magnetic field is set up in the gap between the polar portions. By locating the energizing coil very close to the gap an extremely efficient magnetizing head is obtained, the size of the gap being referred to, by way of example, as .010" to .020", may be varied quite extensively, for it has been found that gaps as small as .001" have worked effectively, as well as gaps in the neighborhood of .040" have also worked satisfactorily.

While the illustrated embodiments of my invention have been referred to as erase heads, it is to be understood that they may also be used to advantage as recording or reproducing heads.

While I have shown certain particular embodiments of my invention, it will, of course, be understood that I do not wish to be limited thereto, since many modifications may be made, and I, therefore, contemplate, by the appended claims, to cover all such modifications as fall within the true spirit and scope of my invention.

I claim as my invention:

1. In an integral electromagnetic erase head structure, a core, a plurality of pole portions on said core with non-magnetic gap portions at the extremities thereof, certain of said pole portions being upstanding and of continuously diminishing dimensions toward the non-magnetic gap portion thereof, and an energizing coil on said certain of said pole portions, said energizing coil having cross sectional dimensions greater than the non-magnetic gap portion of said certain of said pole portions to securely engage the same when placed thereon over the non-magnetic portion thereof and to be readily releasable therefrom over the non-magnetic gap portion thereof.

2. In an integral electromagnetic erase head sturcture, a core, a plurality of pole portions on said core with non-magnetic gap portions at the extremities thereof, certain of said pole portions being upstanding and of continuously diminishing dimensions toward the non-magnetic gap portion thereof, and an energizing coil having cross sectional dimensions greater than the non-magnetic gap portion of said certain of said pole portions to securely engage the same when placed thereon over the non-magnetic portion thereof and to be readily releasable therefrom over the non-magnetic gap portion thereof, the pole portions being disposed such that the last pole portion passed by a traveling magnetic record member is a remaining of said pole portions.

3. In an integral electromagnetic erase head structure, a core, a pair of pole portions on said core with non-magnetic gap portions at the extremities thereof, one of said pole portions being an approach pole and being upstanding and of continuously diminishing dimensions towards the non-magnetic gap portion thereof, and an energizing coil on said approach pole, said energizing coil having cross sectional dimensions greater than the non-magnetic gap portion of said approach pole to securely engage the same when placed thereon over the non-magnetic gap portion thereof and to be readily releasable therefrom over the non-magnetic gap portion thereof.

4. In an integral electro-magnetic erase head structure, a core, a plurality of pole portions on said core with non-magnetic gap portions at the extremities thereof, a pair of said pole portions being upstanding and of continuously diminishing dimensions towards the non-magnetic gap portion thereof, and an energizing coil on each of said pair of said pole portions, said energizing coil having cross sectional dimensions greater than the non-magnetic gap portion of said pair of said pole portions to securely engage the same when placed thereon over the non-magnetic gap portion thereof and to be readily removable therefrom over the non-magnetic gap portion thereof, the remaining pole portions aligned respectively between said pair of said pole portions and forwardly and rearwardly thereof and extending upwardly and then only toward the non-magnetic gap portion of said pair of said pole portions.

5. In an integral electro-magnetic erase head structure, a core, a plurality of pole portions on said core with non-magnetic gap portions at the extremities thereof, certain of said pole portions being upstanding and of continuously diminishing dimensions towards the non-magnetic gap portion thereof, the remaining of said pole portions extending upwardly and then only toward the non-magnetic gap portion of said certain of said pole portions to provide confronting pole faces therebetween, and an energizing coil only on said certain of said pole portions, the pole portions being disposed such that the last pole portion passed by a traveling magnetic record member is a remaining of said pole portions.

6. In an integral electro-magnetic erase head structure, a core, a plurality of pole portions on said core with non-magnetic gap portions at the extremities thereof, one of said pole portions being upstanding and of continuously diminishing dimensions towards the non-magnetic gap portion thereof, and an energizing coil on said one of said pole portions, said energizing coil having cross sectional dimensions greater than the non-magnetic gap portion of said one of said pole portions to securely engage the same when placed thereon over the non-magnetic gap portion thereof and to be readily removable therefrom over the non-magnetic gap portion thereof, the remaining of said pole portions being disposed forwardly and rearwardly from said one of said pole portions and extending upwardly and then only toward the non-magnetic gap portion of said one of said pole portions to provide confronting pole faces therewith.

7. In an integral electro-magnetic erase head structure, a core, a pair of pole portions on said core with electromagnetic gap portions at the extremities thereof, one of said pole portions being an approach pole and being upstanding and of continuously diminishing dimensions towards the non-magnetic gap portion thereof, the remaining pole portion being a departure pole and extending upwardly and then only toward the non-magnetic gap portion of said approach pole to provide confronting pole faces therebetween, and an energizing coil only on said approach pole, the departure pole being disposed such that it is the last pole portion to be passed by a traveling magnetic record member.

8. In an integral electro-magnetic erase head structure, a core, a plurality of pole portions on said core with non-magnetic gap portions at the extremities thereof, one of said pole portions being upstanding and of continuously diminishing dimensions toward the non-magnetic gap portion thereof, the remaining of said pole portions lying respectively forwardly and rearwardly of said one of said pole portions and extending upwardly and then only toward the non-magnetic gap portion of said one of said pole portions to provide confronting pole faces therebetween, and an energizing coil only on said one of said pole portions, the pole portions being disposed such that the last pole portion passed by a traveling magnetic record member is one of the remaining of said pole portions.

9. In an integral electro-magnetic erase head structure, a core, a plurality of pole portions on said core with non-magnetic gap portions at the extremities thereof, a pair of said pole portions being upstanding and of continuously diminishing dimensions toward the non-magnetic portions thereof, the remaining of said pole portions lying respectively between said pair of said pole portions and forwardly and rearwardly of said pair of said pole portions and extending upwardly and then only toward the non-magnetic gap portion of said pair of said pole portions to provide confronting pole faces therewith, and an energizing coil only on each of said pair of said pole portions, the pole portions being disposed such that the last pole portion passed by a traveling magnetic record member is one of the remaining of said pole portions.

10. In an electromagnetic erase head structure, a core, a pair of pole portions extending from said core with non-magnetic gap portions at the extremities thereof, one of said poles being upstanding and having a base portion adjacent said core of relatively large cross-sectional area and having its extremity remote from said core of substantially smaller cross-sectional area than said base portion, and an energizing coil on said one pole portion, said energizing coil having cross-sectional dimensions greater than the extremity of said one pole to fit over the extremity of said one pole and to be readily releasable therefrom over the non-magnetic gap portion thereof.

11. In an electromagnetic erase head structure, a core, an elongated first pole portion extending from said core and having a base portion adjacent said core of relatively large cross-sectional area and having a free end portion remote from said core of substantially smaller cross-sectional area than said base portion, the core having a further pole portion terminating in proximity to said free end portion to define a non-magnetic gap, and an energizing coil on said first pole portion having cross-sectional dimensions greater than the cross-sectional dimensions of said free end portion of said first pole portion, the exposed area of the first pole portion between the coil and the pole free end being small in comparison to the area of the first pole portion covered by said coil.

12. In magnetic apparatus comprising an electromagnetic erase head structure, a core, an elongated first pole portion extending from said core and having a base portion adjacent said core of relatively large cross-sectional area and having a free end portion remote from said core of substantially smaller cross-sectional area than said base portion, said core having further pole portions terminating in proximity to opposite sides of said free end portion to define a pair of non-magnetic gaps therewith, means for guiding a ferromagnetic medium successively across said gaps, and an energizing coil on said first pole portion, said energizing coil having minimum cross-sectional dimensions greater than the cross-sectional dimensions of said first pole free end portion.

References Cited in the file of this patent

UNITED STATES PATENTS

| | | |
|---|---|---|
| 2,230,913 | Schuller | Feb. 4, 1941 |
| 2,351,007 | Camras | June 13, 1944 |
| 2,418,542 | Camras | Apr. 8, 1947 |

FOREIGN PATENTS

| | | |
|---|---|---|
| 617,796 | Germany | Aug. 28, 1935 |
| 622,623 | Germany | Dec. 2, 1935 |
| 805,434 | France | Nov. 19, 1936 |